United States Patent
Kim et al.

(10) Patent No.: US 8,173,712 B2
(45) Date of Patent: *May 8, 2012

(54) MODIFIED INORGANIC MATERIAL WITH ION EXCHANGE CAPACITY, COMPOSITE ELECTOLYTE MEMBRANE COMPRISING THE SAME, AND FUEL CELL COMPRISING THE COMPOSITE ELECTROLYTE MEMBRANE

(75) Inventors: Hae-kyoung Kim, Seoul (KR); Jae-sung Lee, Pohang-si (KR); Hyun-chul Lee, Ulsan-si (KR); Hyuk Chang, Seongnam-si (KR); Chang-houn Rhee, Pohang-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1655 days.

This patent is subject to a terminal disclaimer.

(21) Appl. No.: 11/150,366

(22) Filed: Jun. 13, 2005

(65) Prior Publication Data
US 2005/0282052 A1    Dec. 22, 2005

(30) Foreign Application Priority Data
Jun. 17, 2004    (KR) .................. 10-2004-0045026

(51) Int. Cl.
*C08J 5/20*    (2006.01)
*C08J 5/22*    (2006.01)
*H01M 8/10*    (2006.01)

(52) U.S. Cl. .......... 521/27; 502/401; 429/491; 429/492; 429/493

(58) Field of Classification Search .................. 502/401; 521/27; 429/33, 491, 492, 493
See application file for complete search history.

(56) References Cited

U.S. PATENT DOCUMENTS

| | | | |
|---|---|---|---|
| 4,935,527 A * | 6/1990 | Kitagawa et al. | 548/966 |
| 5,849,428 A | 12/1998 | Hamlen | |
| 5,919,583 A | 7/1999 | Grot et al. | |
| 6,528,029 B1 * | 3/2003 | Dettling et al. | 423/210 |
| 2002/0098974 A1 * | 7/2002 | Inagaki et al. | 502/208 |
| 2003/0170521 A1 * | 9/2003 | Zhang | 429/33 |
| 2005/0042489 A1 * | 2/2005 | Fukuta et al. | 429/30 |
| 2005/0107624 A1 * | 5/2005 | Lin et al. | 554/174 |

FOREIGN PATENT DOCUMENTS

| | | | |
|---|---|---|---|
| CN | 1501538 | | 6/2004 |
| JP | 11171947 | | 6/1999 |
| JP | 2001-155744 | * | 6/2001 |
| JP | 2004075895 | | 3/2004 |
| WO | 02-084767 | | 10/2002 |
| WO | WO03102971 | | 12/2003 |

* cited by examiner

*Primary Examiner* — Stuart Hendrickson
*Assistant Examiner* — Daniel Berns
(74) *Attorney, Agent, or Firm* — H.C. Park & Associates, PLC

(57) ABSTRACT

The present invention relates to a modified inorganic material with excellent cation exchange capacity. In addition, the invention relates to a method of preparing the modified inorganic material, a composite electrolyte membrane comprising the modified inorganic material powder that has excellent methanol-repelling ability, and a fuel cell comprising the composite electrolyte membrane. The modified inorganic material includes an inorganic material, and a cation exchanger bonded to the inorganic material.

7 Claims, 4 Drawing Sheets

MODIFIED INORGANIC MATERIAL WITH ION EXCHANGE CAPACITY, COMPOSITE ELECTOLYTE MEMBRANE COMPRISING THE SAME, AND FUEL CELL COMPRISING THE COMPOSITE ELECTROLYTE MEMBRANE

CROSS REFERENCE TO RELATED APPLICATION

This application claims priority to and the benefit of Korean Patent Application No. 10-2004-0045026, filed on Jun. 17, 2004, in the Korean Intellectual Property Office, the disclosure of which is incorporated herein in its entirety by reference.

BACKGROUND OF THE INVENTION

1. Field of the Invention

The present invention relates to the modification of an inorganic material and a modified inorganic material. In particular, the present invention relates to a composite electrolyte membrane comprising a modified inorganic material, and a fuel cell comprising the composite electrolyte membrane.

2. Description of the Related Art

Direct methanol fuel cells (DMFCs) use an aqueous methanol solution as fuel. DMFCs can easily be operated at room temperature and may have a small size. As a result, DMFCs can be used as power sources for various applications including pollution-free electric cars, domestic power generating systems, mobile communications, medical equipment, military use, space-related businesses and portable electric devices.

Figure 1:
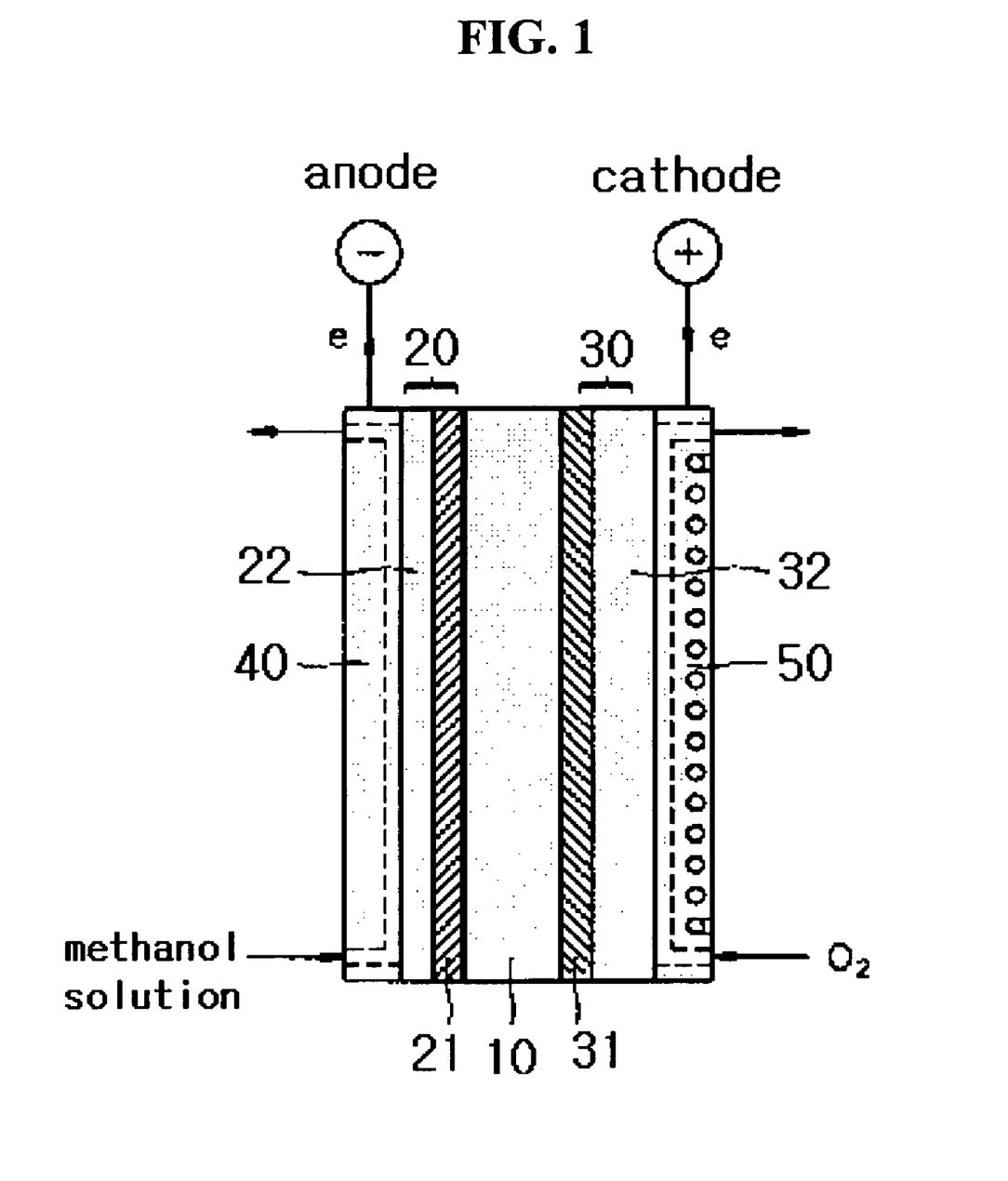
FIG. 1 is a sectional view that illustrates the structure of a standard fuel cell.

FIG. 1 illustrates the conventional structure of a DMFC. Referring to FIG. 1, a DMFC includes an anode 20 to which fuel is provided, a cathode 30 to which an oxidant is provided, and an electrolyte membrane 10 interposed between the anode 20 and the cathode 30. In general, the anode 20 includes an anode diffusion layer 22 and an anode catalyst layer 21, and the cathode 30 includes a cathode diffusing layer 32 and a cathode catalyst layer 31. A separator 40 includes a channel through which fuel is provided to the anode 20, and acts as a conductor by transporting electrons generated in the anode 20 to an external circuit or a neighboring unit cell. A separator 50 includes a channel through which an oxidant is provided to the cathode 30, and acts as a conductor by transmitting electrons provided from an external circuit or a neighboring unit cell to the cathode 30. In DMFCs, an aqueous methanol solution is provided to an anode as a fuel, and atmospheric air is provided to a cathode as an oxidant.

The aqueous methanol solution passes through the anode diffusion layer 22 and then arrives at the anode catalyst layer 21 where it decomposes into carbon dioxide, electrons, protons, etc. The protons pass through the electrolyte membrane 10, and then arrive at the cathode catalyst layer 31. The electrons are transported to the external circuit. The carbon dioxide is discharged to the outside. The protons, the electrons, and the oxygen from atmospheric air transmitted through the cathode diffusing layer 32 react with each other in the cathode catalyst layer 31 to produce water.

In the DMFC, the electrolyte membrane 10 acts as a proton conductor, an electron insulator, and as a separator. The electrolyte membrane 10 prevents unreacted fuel from flowing to the cathode 30 and prevents unreacted oxidant from flowing to the anode 20. Thus, the electrolyte membrane 10 acts as a separator.

An electrolyte membrane of a DMFC may comprise a polymer electrolyte with a cation exchange capacity such as a highly fluorinated polymer with sulfonate groups (e.g., Nafion®). Such polymers have a main chain comprising a fluorinated alkylene and a side chain comprising a sulfonic acid group-terminated by a fluorinated vinyl ether. The polymer electrolyte membrane retains a sufficient amount of water, thus exhibiting excellent ionic conductivity.

In addition, the polymer electrolyte membrane can diffuse methanol as well as water. In DMFCs, an aqueous methanol solution is provided to an anode as a fuel. Some unreacted methanol in the aqueous methanol solution can permeate into the polymer electrolyte membrane, causing the polymer electrolyte membrane to swell. In addition, methanol permeated into the polymer electrolyte membrane also diffuses into a cathode catalyst layer. The term "methanol crossover" indicates a phenomenon whereby methanol fed to an anode passes through an electrolyte membrane and then arrives at a cathode. The methanol crossover causes direct oxidation of methanol at a cathode, where a proton and oxygen should be electrochemically reduced. Therefore, the cathode potential decreases, and the DMFC performance can be substantially deteriorated.

Research into a method to suppress the methanol crossover at the polymer electrolyte membrane has been conducted. For example, U.S. Pat. Nos. 5,919,583 and 5,849,428 disclose a composite electrolyte membrane that is fabricated by diffusing an inorganic filler into a polymer electrolyte matrix.

Although the composite electrolyte membrane exhibits low methanol permeability, it also has poor proton conductivity due to the presence of the inorganic filler. The inorganic filler has a poor cation exchange capacity which means that as the concentration of the inorganic filler in the composite electrolyte membrane increases, the permeability of methanol decreases. Thus, conventional technologies do not provide a composite electrolyte with a cation exchange capacity that is superior to that of the Nafion® membrane.

SUMMARY OF THE INVENTION

The present invention provides a modified inorganic material with excellent cation exchange capacity.

The present invention also provides a method of fabricating a modified inorganic material with excellent cation exchange capacity.

The present invention also provides a composite electrolyte membrane that comprises the modified inorganic material powder and has excellent methanol-repelling ability.

The present invention also provides a fuel cell comprising the composite electrolyte membrane.

Additional features of the invention will be set forth in the description which follows, and in part will be apparent from the description, or may be learned by practice of the invention.

The present invention discloses a modified inorganic material comprising an inorganic material and a cation exchanger bonded to the inorganic material.

The present invention also discloses a method of preparing the modified inorganic material. The method comprises hydrothermally synthesizing a mixture of a surfactant with —SH, an inorganic material precursor, and water to produce a precipitate, oxidizing the precipitate using an oxidant, and sulfonating the oxidized precipitate.

The present invention also discloses a method of preparing a modified inorganic material comprising hydrothermally synthesizing a mixture of a surface-active agent with —SH, an inorganic material, and water and sulfonating the thermally synthesized inorganic material.

The present invention also discloses a method of preparing a modified inorganic material comprising hydrothermally synthesizing a mixture of a surfactant with a carboxyl group, an inorganic material precursor, and water to induce precipitation and oxidizing the precipitate using an oxidant.

The present invention also discloses a method of preparing the modified inorganic material comprising hydrothermally synthesizing a mixture of a surfactant with a carboxyl group, an inorganic material, and water.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

A modified inorganic material according to the present invention includes an inorganic material and a cation exchanger that is bonded to the inorganic material. The inorganic material may be combined with the cation exchanger by hydrogen bonding, chemical adsorption, or physical adsorption, for example.

The inorganic material may be, but is not limited to, an oxide. The oxide may be a metal oxide for example. The metal oxide may be, but is not limited to, alumina, zirconia, titania, magnesia, or a combination thereof.

The cation exchanger may be, for example, a sulfonic acid-based cation exchanger or a carboxylic acid-based cation exchanger.

The sulfonic acid-based cation exchanger may be an organic compound comprising at least an $SO_3X$ group where X is hydrogen, an alkali metal or, at least a hydrogen bonding site. In this case, the hydrogen bonding site refers to an atom with strong electronegativity such as F, O, N, and the like.

The sulfonic acid-based cation exchanger may be XOOC—R—$SO_3$X' where R is a C1-C20 alphatic or aromatic hydrocarbon, and X and X' each can be hydrogen, an alkaline metal, an organic silicon compound containing an substituted terminal ring with —$SO_3$X, for example, but is not limited thereto. The cation exchanger XOOC—R—$SO_3$X' may be XOOC—$(CH_2)_5$—$SO_3$X', XOOC—$(CH_2)_{10}$—$SO_3$X', or the like.

The organic silicon compound comprising a substituted terminal ring with —$SO_3$X may be $(CH_3)_3$Si—$(CH_2)_2$—$SO_3$X, $(CH_3)_3$Si—$(CH_2)_3$—$SO_3$X, or the like.

The carboxylic acid-based cation exchanger may be an organic compound comprising at least a —COOX group where X is hydrogen, an alkali metal, or at least a hydrogen bonding site. In this case, the hydrogen bonding site refers to an atom with strong electronegativity such as F, O, N, and the like.

The carboxylic acid-based cation exchanger may be XOOC—R—COOX' where R is a C1-C20 alphatic or aromatic hydrocarbon, and X and X' each can be hydrogen or an alkali metal, an organic silicon compound containing —COOX, or the like, but is not limited thereto. The cation exchanger XOOC—R—COOX' may be XOOC—$(CH_2)_5$—COOX', XOOC—$(CH_2)_{10}$—COOX', for example.

The organic silicon compound containing a substituted terminal ring with —COOX may be $(CH_3)_3$Si—$(CH_2)_2$—COOX, $(CH_3)_3$Si—$(CH_2)_3$—COOX, for example.

A composite electrolyte membrane may comprise the modified inorganic material of the present invention. If the average particle size of the modified inorganic material is too small, methanol crossover may not occur. If the average particle size is too large, phase separation may occur. Accordingly, the modified inorganic material according the present invention may have an average particle size of about 20 nm-200 nm, and preferably about 30 nm-70 nm, but it is not limited thereto.

The modified inorganic material according to the present invention may be in the form of an amorphous particle, a thorn-like particle, a spherical particle, or a honeycomb porous particle, for example.

In the modified inorganic material according to the present invention, the amount of cation exchanger that is bonded to an inorganic material does not need to be controlled because a larger quantity of cation exchanger provides better ion exchange capacity. The amount of the cation exchanger that is bonded to an inorganic material is directly related to the ion exchange capacity of the modified inorganic material. Therefore, the amount of the cation exchanger that is bonded to an inorganic material is indirectly expressed by using the ion exchange capacity.

The modified inorganic material according to the present invention can have an ion exchange capacity of about 1 mmol/g or greater, and preferably about 1.7 mmol/g or greater. In general, the modified inorganic material may have an ion exchange capacity in a range of about 1 mmol/g-3 mmol/g.

If a modified inorganic material according to the present invention is composed of an inorganic material and an organic ion exchanger, the modified inorganic material can be classified as an organo-inorganic compound.

The modified inorganic material according to the present invention can be used in various purification fields such as a filler for a fuel cell composite electrolyte membrane, an acid catalyst, and an ion exchange material. In particular, when the modified inorganic material is used as a filler for a fuel cell composite electrolyte membrane, the ionic conductivity of the composite electrolyte membrane does not deteriorate due to the fact that the modified material according to the present invention has excellent cation exchange capacity. In addition, the modified inorganic material has excellent methanol-repelling ability which may allow a composite electrolyte membrane comprising the modified inorganic material to exhibit low methanol crossover.

Hereinafter, a first method of preparing a modified inorganic material comprising a sulfonic acid-based cation exchanger bonded to an inorganic material according to the present invention will be described. This method includes hydrothermally synthesizing a mixture of a surfactant with an —SH group, an inorganic material precursor, and water to induce precipitation, oxidizing the precipitate using an oxidant, and sulfonating the oxidized precipitate.

The surfactant have at least an —SH group, or at least an —SH group and at least a hydrogen bonding site. The hydrogen bonding site may refer to, an atom with strong electronegativity such as F, O, N, and the like.

The surfactant with —SH may be XOOC—R—SH where R is a C1-C20 aphatic or aromatic hydrocarbon, and X may be hydrogen, an alkali metal, or an organic silicon compound containing —SH. However, the surfactant is not limited thereto. The XOOC—R—SH may be HOOC—$(CH_2)_{10}$—SH or NaOOC—$(CH_2)_{10}$—SH. The organic silicon compound-based surfactant may be $(CH_3)_3$Si—$(CH_2)_2$—SH, $(CH_3)_3$Si—$(CH_2)_3$—SH, or the like.

The inorganic precursor may be an organic or inorganic compound that can be converted into an inorganic oxide or a metal oxide, but is not limited thereto. The metal oxide precursor may be an alumina precursor, zirconia precursor, titania precursor, magnesia precursor, or a combination of these.

The alumina precursor may be an aluminum-containing organometallic compound or an aluminum-containing inorganic compound that can be converted into an aluminum oxide by an oxidant. In particular, the alumina precursor may be aluminium alkoxides, aluminum hydroxide, or a mixture of these. The aluminum alkoxides may be aluminum tri-sec-butoxide, aluminum isopropoxide, or the like.

The zirconia precursor may be a zirconium-containing organometallic compound or a zirconium-containing inorganic compound that can be converted into a zirconia by an oxidant. In particular, the zirconia precursor may be zirconium butoxide, zirconium hydroxide, or the mixture of these.

The titania precursor may be a titanium-containing organometallic compound or a titanium-containing inorganic compound that can be converted into a titania by an oxidant. In particular, the titania precursor may be titanium butoxide, titanium isopropoxide, or the mixture of these.

The magnesia precursor may be a magnesium-containing organometallic compound or a magnesium-containing inorganic compound that can be converted into magnesia by an oxidant. In particular, the magnesia precursor may be methylmagnesium tert-butoxide, magnesium hydroxide, or the mixture of these.

The mixture to be hydrothermally synthesized in the first step may have various compositions. In order to obtain a properly formed precipitate of the appropriate size, the mixture must contain sufficient amounts of water, the surfactant, and the inorganic precursor. Those skilled in the art can easily determine the specific amounts of water, the surfactant, and the inorganic precursor.

A "hydrothermal synthesis" is a heating process for a reaction mixture in which water is used as a reaction medium. The hydrothermal synthesis process can be carried out in a sealed reactor, such as an autoclave. In this case, the hydrothermal synthesis can be performed under pressure.

If the temperature of the hydrothermal synthesis is very low, the synthesis is inefficient. On the other hand, when the hydrothermal synthesis is performed at very high temperatures, the size and form of the resulting precipitate may be difficult to control because the reaction medium vaporizes rapidly. The hydrothermal synthesis may be performed in a temperature range of about 60° C.-150° C.

When the hydrothermal synthesis is performed too quickly, the synthesis may not be carried out to completion. On the other hand, when the hydrothermal synthesis is performed too slowly, the hydrothermal synthesis may be saturated. A preferable range of time for the hydrothermal synthesis may vary depending on factors including the type and concentration of the surfactant, the type and concentration of the inorganic precursor, and the temperature for the hydrothermal synthesis. Those skilled in the art can easily determine a desirable time range for the hydrothermal synthesis.

Through the hydrothermal synthesis, the inorganic precursor can be converted into a hydroxide, and the surfactant can be bonded to or adsorb to a precipitated hydroxide. Hereinafter, the hydroxide to which the surfactant is bonded or adsorbed is referred to as a composite precipitate. Thus, the surfactant can affect the particle size and form of the hydroxide.

In the second step of the first method according to the present invention, the composite precipitation is oxidized using an oxidant. An oxidant can either be added to the hydrothermally synthesized reaction mixture in the first step or it can be added to the precipitate that is isolated from the hydrothermally synthesized reaction mixture from step 1. Either of these oxidation steps converts the hydroxide into an oxide. As a result the composite precipitate obtained in the first step is converted into a composite precipitate composed of the oxide and the surfactant in the second step. In this case, the surfactant is bonded to or adsorbed to the oxide.

The oxidant used in the second step may be hydrogen peroxide, hydrogen peroxide solution, or the like. In addition, the mixing ratio of the oxidant to the composite precipitate may vary. In general, the mixing ratio of the oxidant to the composite precipitate may be in the range of about 1:1-1:3.

The oxidation process can be carried out at room temperature or higher. The preferable temperature for the oxidation process may vary depending on the kind of oxidant used. In general, as the temperature increases, the oxidation process is facilitated. However, when the temperature exceeds a specific value, the oxidant may decompose. For example, when hydrogen peroxide is used as the oxidant, the oxidation process may be performed at room temperature up to about 80° C.

When the oxidation process is performed for a short period of time, the hydroxide may be insufficiently converted into an oxide. On the other hand, when the oxidation process is performed over a long period, the conversion into an oxide can be saturated. The desirable range of time for the oxidation process may vary depending on process conditions, such as the kind of the oxidant, the amount of the oxidant, the concentration for the oxidation process, and the like. Those skilled in the art can easily determine the specific range of time.

In the third step of the first method according to the present invention, the oxidized precipitate is sulfonated. The oxidized precipitate includes an oxide and a surfactant that is bonded to or adsorbed to the oxide. The surfactant contains, as mentioned above, —SH. In this step the —SH group of the surfactant may be converted into —$SO_3H$.

The sulfonation may be performed by a sulphuric acid treatment, using an aqueous sulphuric acid solution, for example. The concentration of the aqueous sulphuric acid solution may vary. When the concentration of the aqueous sulphuric acid solution is too low, the number of ions decreases. On the other hand, there is no upper limit to the concentration of the sulphuric acid aqueous solution. In general, the sulphuric acid aqueous solution may have a concentration in the range of about 1-5 wt %.

The mixture ratio of the oxidized precipitate to the sulphuric acid aqueous solution may vary. However, when the amount of the aqueous sulphuric acid solution is too low, the number of ions decreases. On the other hand, there is no upper limit to the amount of the sulphuric acid aqueous solution. In general, the mixture weight ratio of the oxidized precipitate to the sulphuric acid aqueous solution may be in the range of about 1:1,000-1:300.

The modified inorganic material prepared in the above-mentioned process can have —SO$_3$X where X is an alkali metal, through an additional cation exchanging process.

Hereinafter, a second method of preparing a modified inorganic material comprising a sulfonic acid-based cation exchanger bonded to an inorganic material according to the present invention will be described. This method includes first hydrothermally synthesizing a mixture of a surfactant with —SH, an inorganic material, and water and then sulfonating the hydrothermally synthesized inorganic material.

The surfactant and inorganic material of the first step of the second method according to the present invention are identical to the surfactant and inorganic material of the first method.

In addition, the inorganic material used in the second method may have any particle size. In general, the inorganic material may have an average particle size in the range of about 20 nm-200 μm.

When the filler of the composite electrolyte membrane comprises the modified inorganic material that is prepared, a very small average particle size of the inorganic material results in an increased amount of methanol crossover, and too large an average particle size of the inorganic material causes phase separation. As a result, the inorganic material may have the average particle size of about 20 nm-200 nm, and preferably, about 30 nm-70 nm.

The inorganic material may have any particle form. The inorganic material may have, for example, an amorphous particle, a thorn-like particle, a spherical particle, a honeycomb porous particle. The temperature conditions and duration of the hydrothermal synthesis in the second method are the same as those of the first method. In the hydrothermal synthesis, the surfactant can be bonded to or adsorbed to the inorganic material. In this case, the surfactant permeates the inorganic material powder.

In the second step of the second method according to the present invention, the inorganic material to which the surfactant is bonded or adsorbed in the hydrothermal synthesis is sulfonated. The surfactant contains an —SH group that can be converted into —SO$_3$H using sulfonation, as mentioned above.

As in the sulfonation of the first method, this sulfonation can be performed using sulphuric acid treatment, for example. A sulphuric acid aqueous solution with a varying concentration may be used in the sulphuric acid treatment. When the concentration of sulphuric acid aqueous solution is too low, the number of ions that are present decreases. There is no upper limit to the concentration of sulphuric acid aqueous solution. In general, the sulphuric acid aqueous solution may have a concentration of about 1-5 wt %.

The mixture ratio of the inorganic material to which the surfactant is bonded or adsorbed to the sulphuric acid aqueous solution may vary. However, when the amount of the sulphuric acid aqueous solution is too small, the amount of ions that are present decreases. On the other hand, there is no limit to the concentration of the sulphuric acid aqueous solution. In general, the mixture weight ratio of the inorganic material to the sulphuric acid aqueous solution may be in the range of about 1:1,000-1:300.

In a third method according to the present invention, a modified inorganic material comprising a carboxylic acid-based cation exchanger which is bonded to an inorganic material is prepared. This method includes hydrothermally synthesizing a mixture of a surfactant with a carboxyl group, an inorganic material precursor, and water to produce a precipitate and oxidizing the precipitate using an oxidant.

In a fourth method according to the present invention, a modified inorganic material comprising a carboxylic acid-based cation exchanger which is bonded to an inorganic material is prepared. The fourth method includes hydrothermally synthesizing a mixture of a surfactant with a carboxyl group, an inorganic material precursor, and water.

In the third and fourth methods, the surfactant comprising a carboxyl group may be an organic compound comprising at least a —COOX group, where X is hydrogen or alkali metal, or an organic compound comprising at least a —COOX group where X is hydrogen or alkali metal and at least a hydrogen bonding site. In this case, the hydrogen bonding site may be, for example, an atom with strong electronegativity such as F, O, N.

The surfactant containing a carboxyl group may be XOOC—R—COOX' where R is a C1-C20 aphatic or aromatic hydrocarbon, and X and X' each can be hydrogen or an alkali metal an organic silicon compound containing —COOX and the like. However, the surfactant containing a carboxyl group is not limited thereto. The surfactant XOOC—R—COOX' may be XOOC—(CH$_2$)$_5$—COOX', XOOC—(CH$_2$)$_{10}$—COOX', or the like.

The organic silicon compound containing —COOX may be (CH$_3$)$_3$Si—(CH$_2$)$_2$—COOX, (CH$_3$)$_3$Si—(CH$_2$)$_3$—COOX, or the like.

The inorganic material precursor of the third and fourth methods and the oxidant of the third method are the same as in the first and second methods.

Hereinafter, a composite electrolyte membrane according to the present invention will be described in detail. The composite electrolyte membrane includes a modified inorganic material that is dispersed in a proton-conducting polymer matrix.

As described above, the modified inorganic material has a methanol-repelling ability as well as excellent cation exchange capacity. A composite electrolyte membrane comprising the modified inorganic material according to the present invention prevents methanol crossover while having high proton conductivity. In addition, increasing the amount of the modified inorganic material may allow the composite electrolyte membrane to retain the high hydrogen-ion conductivity. As a result, the methanol-repelling ability can be enhanced by increasing the concentration of the modified inorganic material, without the loss of the high proton conductivity.

When the concentration of the modified inorganic material in the composite electrolyte membrane is too low, the methanol-repelling ability of the composite electrolyte membrane decreases. On the other hand, when the concentration of the modified inorganic material is too high, the relative concentration of the proton-conducting polymer matrix becomes relatively small, thereby decreasing the physical strength of the composite electrolyte membrane. Accordingly, the concentration of the modified inorganic material contained in the composite electrolyte membrane may be in the range of about 2-98 wt %, and preferably about 3-30 wt %.

It is desirable that the modified inorganic material dispersed in the polymer matrix has a nano-scale particle. For example, the modified inorganic particle may have a particle size of about 20 nm-200 nm, and preferably about 30 nm-70 nm.

The proton-conducting polymer used in the composite electrolyte membrane may be a polymer that comprises a cation exchanger. The cation exchanger may be, for example, a sulfonic acid group, a carboxyl group, a phosphate group, an imide group, a sulfonimide group, or a hydroxyl group.

In particular, examples of the cation exhanger may include but are not limited to trifluoroethylene, tetrafluoroethylene, styrene-divinyl benzene, α,β,β-trifluorostyrene, styrene, imide, sulfone, phosphazene, etherether ketone, or ethylene oxide, polyphenylene sulfide, a homopolymer or copolymer of an aromatic group or a derivative of these. In this case, these polymers may be used in isolation or as a combination of the polymers.

The cation exchanger-containing polymer may preferably include a highly fluorinated polymer, where the ratio of the number of fluorine atoms bonded to carbon atoms at a main chain and side chains to the sum of the numbers of fluorine atoms and hydrogen atoms that are bonded to the carbon atoms at a main and side chains is 90% or more.

The cation exchanger-containing polymer also may comprise a highly fluorinated polymer with sulfonate groups. The highly fluorinated polymer with sulfonate groups has a substituted terminal ring with sulfonate at its side chain. In addition, for the highly fluorinated polymer with sulfonate groups, the ratio of the number of fluorine atoms bonded to carbon atoms at a main chain and side chains to the sum of the numbers of fluorine atoms and hydrogen atoms that are bonded to the carbon atoms at a main chain and side chains is 90% or more.

The cation exchanger-containing polymer may be, for example, those described in U.S. Pat. Nos. 3,282,875, 4,358,545, 4,940,525, and 5,422,411.

In particular, the cation exchanger-containing polymer may be a homopolymer formed from a $MSO_2CFR_fCF_2O[CFYCF_2O]_nCF=CF_2$ monomer, a $MSO_2CFR_fCF_2O[CFYCF_2O]_nCF=CF_2$ monomer, or a copolymer formed from at least a monomer selected from ethylene, halogenated ethylene, perfluorinated α-olefin, and perfluoro alkyl vinyl ether. In the $MSO_2CFR_fCF_2O[CFYCF_2O]_nCF=CF_2$ monomer, $R_f$ may be a radical such as fluorine or a C1-C10 perfluoroalkyl group, and Y may be a radical such as fluorine or a trifluoromethyl group, n is an integer between 1 and 3, and M may be a radical including, but not limited to fluorine, a hydroxyl group, an amino group, and an —OMe group, where Me is a radical such as an alkali metal and a fourth ammonium group.

In addition, the cation exchanger-containing polymer can be a polymer comprising a carbon main chain that is substituted with fluorine and pendant groups represented by —O—$[CFR'_f]_b[CFR_f]_aSO_3Y$. In this formula is "a" is an integer between 0 and 3, b is an integer between 0 and 3 and a+b is at least 1. Each of $R_f$ and $R'_f$ may be a halogen atom or an alkyl group substantially substituted with fluorine, and Y is hydrogen or alkali metal.

Also, the cation exchanger-containing polymer may be a sulfonic fluoropolymer containing pendant groups represented by $ZSO_2—[CF_2]_a—[CFR_f]_b—O—$, where Z is halogen, an alkali metal, hydrogen, or —OR where R is a C1-C10 alkyl or aryl group. "A" is an integer between 0 and 2, b is an integer between 0 and 2 and, a+b is not 0. $R_f$ may be a F, Cl, a C1-C10 perfluoroalkyl group, and a C1-C10 fluorochloroalkyl group.

The cation exchanger-containing polymer can also be a polymer represented by the following structure:

In this formula m is an integer greater than 0, at least one of n, p, and q is an integer greater than 0, $A_1$, $A_2$, $A_3$ are each independently selected from an alkyl group, a halogen atom, $C_yF_{2y+1}$ where y is an integer greater than 0, —OR where R is an alkyl group, a perfluoroalkyl group, or an aryl group, $CF=CF_2$, CN, $NO_2$, and OH. X may include, but is not limited to $SO_3H$, $PO_3H_2$, $CH_2PO_3H_2$, COOH, $OSO_3H$, $OPO_3H_2$, $OArSO_3H$ where Ar is an aromatic group, $NR_3^+$, where R is an alkyl group, a perfluoroalkyl group, or an aryl group, $CH_2NR_3^+$ where R is an alkyl group, a perfluoroalkyl group, or an aryl group.

The thickness of the composite electrolyte membrane according to the present invention may vary and may be in the range of 30 μm to 200 μm. When the composite electrolyte membrane is too thin, the mechanical strength of the composite electrolyte membrane decreases substantially. On the other hand, when the composite electrolyte membrane is too thick, the resistance in the fuel cell substantially increases.

A method of fabricating the composite electrolyte membrane according to the present invention will now be described, but is not limited thereto. First, a proton-conducting polymer solution and a modified inorganic material are mixed. The mixture is cast, and then a solvent is removed therefrom to form a composite electrolyte membrane. Alternatively, a proton-conducting polymer solution and a modified inorganic material are mixed at about 90° C. or greater for at least 12 hours while stirring rapidly. The resulting mixture is cast, and then a solvent was removed therefrom to form a composite electrolyte membrane. Alternatively, a proton-conducting polymer solution and a modified inorganic material are reacted with each other in a high temperature/high pressure autoclave for at least 12 hours. The resulting mixture is cast, and a solvent is removed therefrom to form a composite electrolyte membrane. In addition, a composite electrolyte membrane according to the present invention can be prepared using any commonly-known methods of forming a composite membrane.

The composite electrolyte membrane can be subjected to a pretreatment process before a membrane-electrode assembly (MEA) fabrication process. During the pretreatment process, the composite electrolyte membrane retains a sufficient amount of moisture and a cation exchanging site of the composite electrolyte membrane can also be activated. As a result, the composite electrolyte membrane subjected to the pretreatment process can exhibit an optimum performance.

The pretreatment process will now be described, but is not limited thereto. First, the composite electrolyte membrane is immersed in boiling deionized water for about 2 hours, and then immersed again in a boiling low concentration aqueous sulfuric acid solution for about two hours. Then, the resulting composite electrolyte membrane is immersed in boiling deionized water for about two hours.

The composite electrolyte membrane according to the present invention is suitable for fuel cells that can comprise an electrolyte membrane with a polymer electrolyte. For example, the composite electrolyte membrane is suitable for polymer electrolyte membrane fuel cells (PEMFCs), or preferably in DMFCs, for example. In PEMFCs, a hydrogen-containing gas is provided to an anode. In DMFCs, a vapor mixture of methanol and water, or an aqueous methanol solution is provided to an anode.

Hereinafter, an exemplary embodiment of a fuel cell comprising the composite electrolyte membrane according to the present invention will be described in detail.

A fuel cell according to the present invention includes a cathode, an anode, and an electrolyte membrane interposed between the cathode and the anode. In this case, the electrolyte membrane is the composite electrolyte membrane mentioned above.

The cathode includes a catalyst layer that facilitates the reduction of oxygen. The catalyst layer may include catalyst particles, and a polymer-containing a cation exchanger. The catalyst may be, for example, Pt or Pt/C.

The anode includes a catalyst layer to promote oxidation reactions of hydrogen, methanol, ethanol, and the like. In this case, hydrogen, methanol, and ethanol are used as fuel. The catalyst layer may include a catalyst particle, and a polymer containing a cation exchanger. The catalyst may include, but is not limited to Pt, Pt—Ru, Pt/C, Pt—Ru/C. In particular, the Pt—Ru catalyst and the Pt—Ru/C catalyst are suitable when an organic fuel with the exception of hydrogen is directly provided to the anode.

The catalyst layers of the cathode and the anode contact the composite electrolyte membrane.

The catalysts used in the cathode and the anode may be catalyst metal particles or carrier-supported catalysts comprising the catalyst metal particle and a catalyst carrier. In a carrier-supported catalyst, the carrier may be, for example, a solid particle that has conductivity and has micropores to carry the catalyst metal particle. The solid particle may be, for example, carbon powder. The carbon powder may include, but is not limited to carbon black, ketjen black, acetylene black, activated carbon powder, carbon nanofiber powder, or a mixture of these. The polymer comprising a cation exchanger may include the polymers described above.

The cathode and the anode may further include a gas diffusing layer beside the catalyst layer. The gas diffusing layer is comprised of an electrically conductive multi-porous material. The gas diffusing layer acts as a current collector and a channel through which a reactant and a product are transported. The gas diffusing layer may be for example, carbon paper, preferably water-repellant carbon paper, and more preferably water-repellant carbon paper coated with a water-repelled carbon black layer.

The water-repellant carbon paper includes a hydrophobic polymer such as polytetrafluoroethylene (PTFE). In this case, the hydrophobic polymer is sintered. The gas diffusing layer is water-repellant so that it may channel the migration of both a polar liquid reactant and a gas reactant. In the water-repellant carbon paper containing the water-repellant carbon black layer, the water-repellant carbon black layer may include, but is not limited to, a carbon black, and a hydrophobic polymer as a hydrophobic binder. The hydrophobic polymer may be, for example, PTFE. In addition, the water-repellant carbon black layer is attached to one side of the water-repellant carbon paper. The hydrophobic polymer included in the water-repellant carbon black layer is sintered.

The cathode and the anode can be formed using various methods that are well-known in the art. Therefore, the description for a method of forming the cathode and the anode will be omitted.

The anode for a fuel cell according to the present invention can be powered by, for example, hydrogen, methanol, or ethanol, and preferably a liquid fuel containing polar organic fuel and water. The polar organic fuel may be for example, methanol or ethanol.

The liquid fuel preferably may comprise an aqueous methanol solution. In the fuel cell according to the present invention, the probability of the crossover phenomenon caused by the polar organic fuel can be greatly reduced by the composite electrolyte membrane. As a result, a high-concentration methanol aqueous solution can be used. In addition, even when a low concentration, such as 6-16% methanol aqueous solution is used in the fuel cell according the present invention, the crossover of the polar organic fuel can be substantially prevented by the composite electrolyte membrane. Additionally, the composite electrolyte membrane has excellent proton conductivity. As a result, the fuel cell has long lifetime and efficiency.

The present invention will be described in further detail with reference to the following examples. The following examples are for illustrative purposes and are not intended to limit the scope of the invention.

EXAMPLE 1

Preparation of Modified Alumina (In-Situ)

3-mercaptopropyl trimethyl silane was used as a surfactant, and aluminium tri-2-butoxide was used as an alumina precursor. 5 g of 3-mercaptoprophyl trimethyl silane was mixed with 10 g of aluminium tri-secondary-butoxide until a homogenous solution was obtained. 20 g of distilled water was slowly added to the homogenous solution, and stirred to obtain a gel-phase reaction mixture. The reaction mixture was placed in a Teflon® autoclave, and then hydrothermally synthesized at 100° C. for 24 hours producing a precipitate.

The precipitate was washed with ethanol and water, dried at room temperature for 16 hours, and then dried again at 110° C. for 5 hours.

Figure 2:
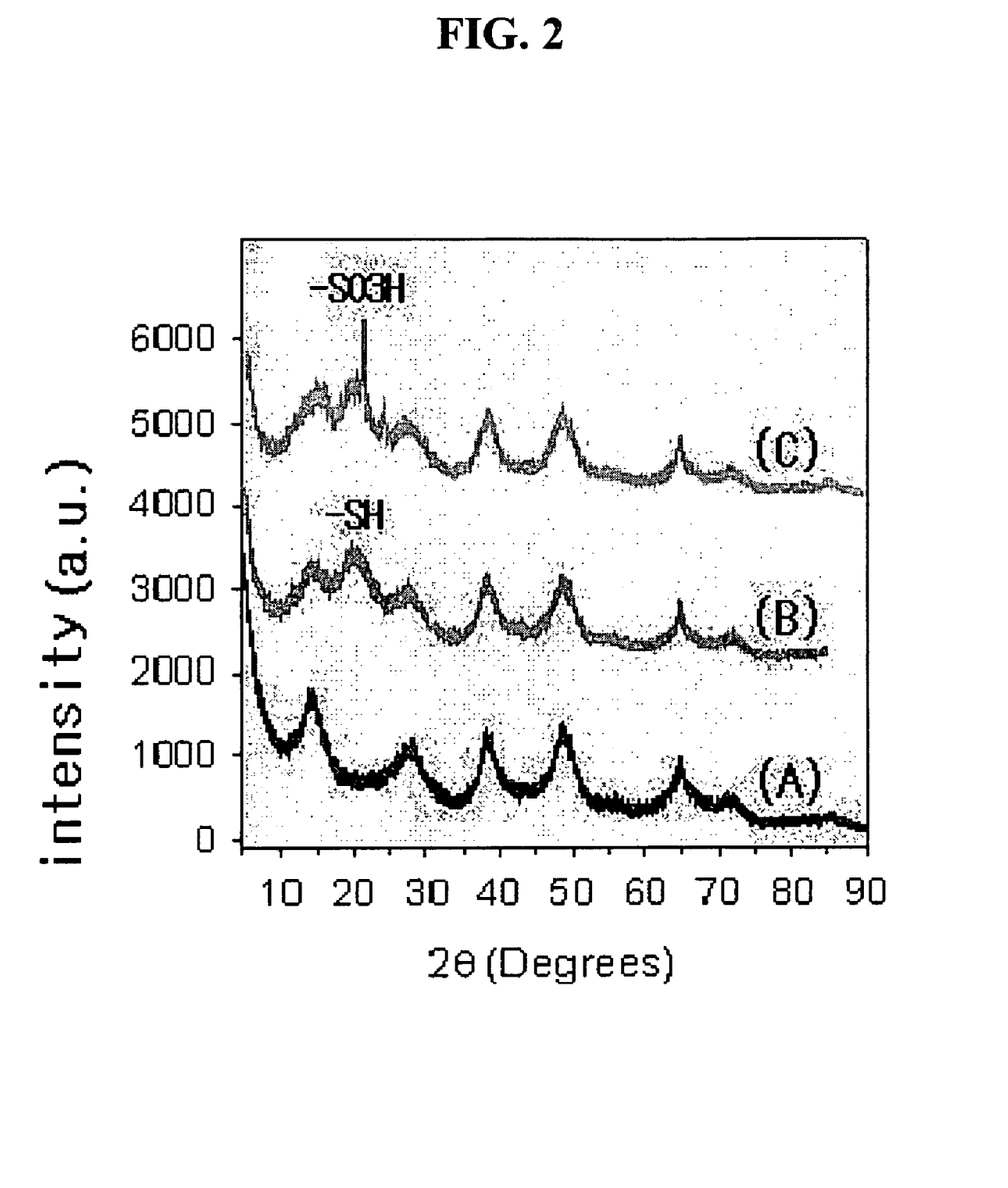
FIG. 2 illustrates the results of x-ray diffraction (XRD) analysis of a modified inorganic material according to an exemplary embodiment of the present invention.

5 g of the dried precipitate was added to 8.33 g of hydrogen peroxide, stirred at room temperature for 6 hours, and then heated at 70° C. for 1 hour. The oxidized precipitate was filtered, washed with water, and then dried at room temperature. The results of x-ray diffraction (XRD) analysis of the oxidized precipitations are shown in FIG. 2.

5 g of the oxidized precipitate was added to 100 g of a 10 wt % sulfuric acid aqueous solution, stirred at room temperature for 30 minutes, filtered, washed, and dried. As a result, a modified-alumina according to the present invention was prepared.

Identification of Modified-Alumina

The modified-alumina prepared in Example 1 was identified using XRD. The results (highlighted by 'C') are shown in FIG. 2. FIG. 2 illustrates a XRD pattern (highlighted by 'A') of boehmite (CYTEC Industries Inc.), and a XRD pattern (highlighted by 'B') of the oxidized precipitations prepared in Example 1.

Referring to FIG. 2, the XRD patterns of the modified alumina and the oxidized precipitates are similar to the XRD pattern of the boehmite. This similarity implies that the modified alumina and the oxidized precipitates contain alumina. However, the XRD patterns of the modified alumina and the oxidized precipitations have a peak at 2θ of 20°. The peak does not appear in the XRD pattern of boehmite.

Figure 3:
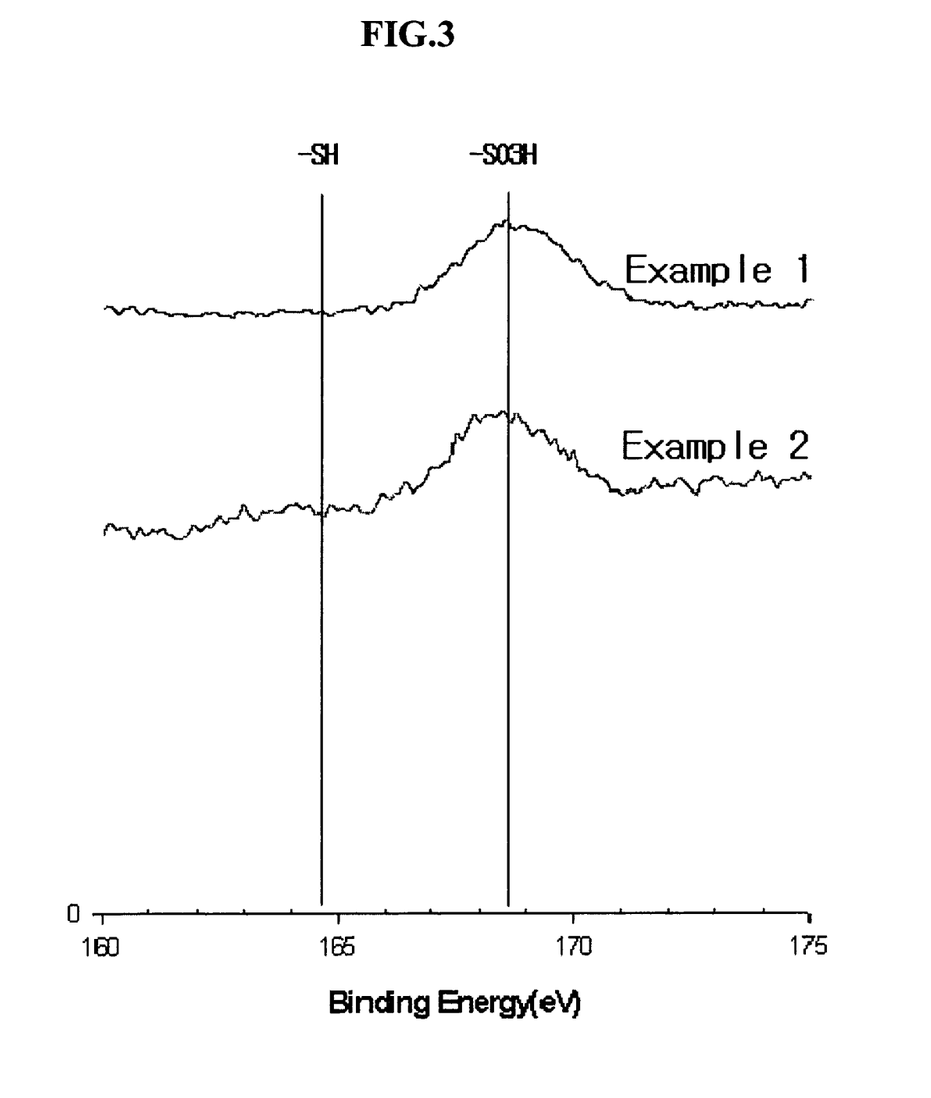
FIG. 3 illustrates the results of x-ray photoelectron spectroscopy (XPS) analysis of the modified inorganic material.

The results of x-ray photoelectron spectroscopy (XPS) analysis of the modified-alumina prepared in Example 1 are shown in FIG. 3. In FIG. 3, a peak resulting from —SH bonding energy is absent, and a peak resulting from —$SO_3H$ bonding energy is present. This confirms that the modified alumina has —$SO_3H$ and the oxidized precipitates have —SH. In the modified alumina, it is believed that there is a hydrogen bond between a cation exchanger containing —$SO_3H$ and alumina. In the oxidized precipitate, it is believed that there is a hydrogen bond between a surfactant containing —SH and alumina.

The modified alumina prepared in Example 1 had an average particle size of 20 nm. The ion exchange capacity of the modified alumina prepared in Example 1 was determined using titration. The result was 1.50 mmol/g. On the other hand, alumina, which is not modified, has an ion exchange capability of 0.01 mmol/g. As a result, it was confirmed that the ion exchange capability of the modified-alumina prepared in Example 1 was improved and the sulfonic acid-based cation exchanger was strongly bonded to or attached to the modified-alumina prepared in Example 1.

EXAMPLE 2

Preparation of Modified Alumina (Ex-Situ)

3-mercaptopropyl trimethyl silane was used as a surfactant, and boehmite (CYTEC Industries Inc.) was used as alumina powder. 5 g of 3-mercaptopropyl trimethyl silane and 10 g of boehmite were mixed with 20 g of distilled water until a homogenous solution was obtained. The reaction mixture was placed in a Teflon® autoclave, and then hydrothermally synthesized at 100° C. for 24 hours.

The resultant alumina powder was filtered, washed with ethanol and water, and dried at room temperature. 5 g of the dried alumina powder was added to 100 g of a 10 wt % sulfuric acid aqueous solution, stirred at room temperature for 30 minutes, filtered, washed, and finally dried. As a result, a modified-alumina according to the present invention was prepared.

Identification of Modified-Alumina

The modified-alumina prepared in Example 2 was identified using XPS. The results are shown in FIG. 3. In FIG. 3, a peak resulting from —SH bonding energy is absent, and a peak resulting from —$SO_3H$ bonding energy is present.

As a result, it was confirmed that the modified alumina has —$SO_3H$ and the half processed alumina has —SH. In the modified alumina, it is believed that there is a hydrogen bond between a cation exchanger containing —$SO_3H$ and alumina. In the half processed alumina, it is believed that there is a hydrogen bond between a surfactant containing —SH and alumina.

The modified alumina prepared in Example 2 had an average particle size of 20 nm. The Ion exchange capability of the modified alumina prepared in Example 2 was determined using titration. The result was 1.50 mmol/g. On the other hand, boehmite, which is non-modified alumina, has an ion exchange capability of 0.01 mmol/g. As a result, it was confirmed that the ion exchange capability of the modified-alumina prepared in Example 2 was improved and the sulfonic acid-based cation exchanger was strongly bonded to or attached to the modified-alumina prepared in Example 2.

EXAMPLE 3

Preparation of composite electrolyte membrane

The modified alumina prepared in Example 1 and a Nafion® (5 wt % of perfluorosulfonic acid-based polymer dispersion in water obtained from DuPont) proton-conducting polymer were used to prepare the composite electrolyte membrane. 0.03 g of the modified alumina prepared in Example 1 and 20 g of Nafion® dispersion in water were mixed, and then placed in a Teflon® autoclave. The resulting mixture was refluxed at 90° C. under a pressure of 80 psi for 24 hours. The resulting composition material was molded, and heated in an oven at 130° C. for 4 hours to prepare a composite electrolyte membrane that was 150 μm thick.

The ionic conductivity of the composite electrolyte membrane prepared in Example 3 was identified using 4-point probing. The proton conductivity of this composite electrolyte membrane was measured at 30° C., 50° C., and 70° C. The ionic conductivity of the composite electrolyte membrane is shown in Table 1. Table 1 also shows the ionic conductivity of Nafion® 115, a commonly used electrolyte membrane manufactured by DuPont). Before measuring the ionic conductivity, the composite electrolyte membrane of Example 3 and Nafion® 115 were immersed in boiling deionized water for 2 hours, immersed in a low-concentration boiling aqueous sulfuric acid solution for another 2 hours, and then finally immersed in the boiling deionized water for another 2 hours.

TABLE 1

| Agent Name | Ionic Conductivity (S/cm) | | |
| --- | --- | --- | --- |
|  | 30° C. | 50° C. | 70° C. |
| Example 3 | 0.0609 | 0.0830 | 0.1223 |
| Nafion ® 115 | 0.07 | 0.09 | 0.11 |

As shown in Table 1, the ionic conductivity of the composite electrolyte membrane prepared in Example 3 was about equal to or greater than the ionic conductivity of Nafion® 115. Therefore, the composite electrolyte membrane prepared in Example 3 is suitable for an electrolyte membrane for a fuel cell.

The methanol-repelling ability of the composite electrolyte membrane prepared in Example 3 was identified through a methanol permeability measurement using a diffusion cell. The methanol permeability was measured by providing a 2M methanol aqueous solution to one side of an electrolyte membrane and then measuring the amount of methanol and water that permeate to the other side of the electrolyte membrane using gas chromatography.

The methanol permeability of the composite electrolyte membrane prepared in Example 3 was found to be as low as about 9.8% of the methanol permeability of Nafion®115. This low permeability is a result of the excellent methanol-repelling ability of the modified alumina according to the present invention as well as the excellent methanol-repelling ability of the composite electrolyte membrane of Example 3 that comprises the modified alumina.

EXAMPLE 4

Fabrication of Fuel Cell

A fuel cell was fabricated using the composite electrolyte membrane prepared in Example 3 as an electrolyte membrane. The fuel cell comprises an anode and a cathode. A PtRu alloy catalyst was used in the anode and a Pt catalyst was used in the cathode. The anode, the cathode, and the composite electrolyte membrane prepared in Example 2 were coupled with one another at 5 MPa at 120° C. to form a membrane-electrode assembly (MEA).

COMPARATIVE EXAMPLE

Fuel Cell Containing Alumina Fiber

A fuel cell was prepared using a composite electrolyte membrane which comprises a non-modified alumina fiber. In this case, the non-modified alumina fiber was used as a filler.

Hereinafter, a method of forming the composite electrolyte membrane will be described. Unmodified boehmite alumina fiber CYTEC Industries Inc.) was used as a filler and Nafion® (DuPont) was used as a proton-conducting polymer. 0.03 g of the unmodified alumina fiber was mixed with 20 g of Nafion® dispersion in water, and then placed in a Teflon® autoclave. The resulting mixture was refluxed at 90° C., at 80 psi, for 24 hours. The resultant composition material was molded and heated in an oven at 130° C. for 4 hours to form a composite electrolyte membrane that was 150 μm thick.

A fuel cell was fabricated in the same manner as in Example 4 except that the composite electrolyte membrane prepared in the Comparative Example was used.

Fuel Cell Performance Test

A separator for a fuel supply and a separator for oxidant supply were attached to a cathode and an anode of each of the fuel cells fabricated in Example 4 and Comparative Example, respectively. Then, a unit cell performance was measured using 3 ml/min of an 8 wt % aqueous methanol solution as fuel and 50 ml/min of atmospheric air as an oxidant at an operating temperature of 5° C. The results are shown in FIG. 4.

Figure 4:
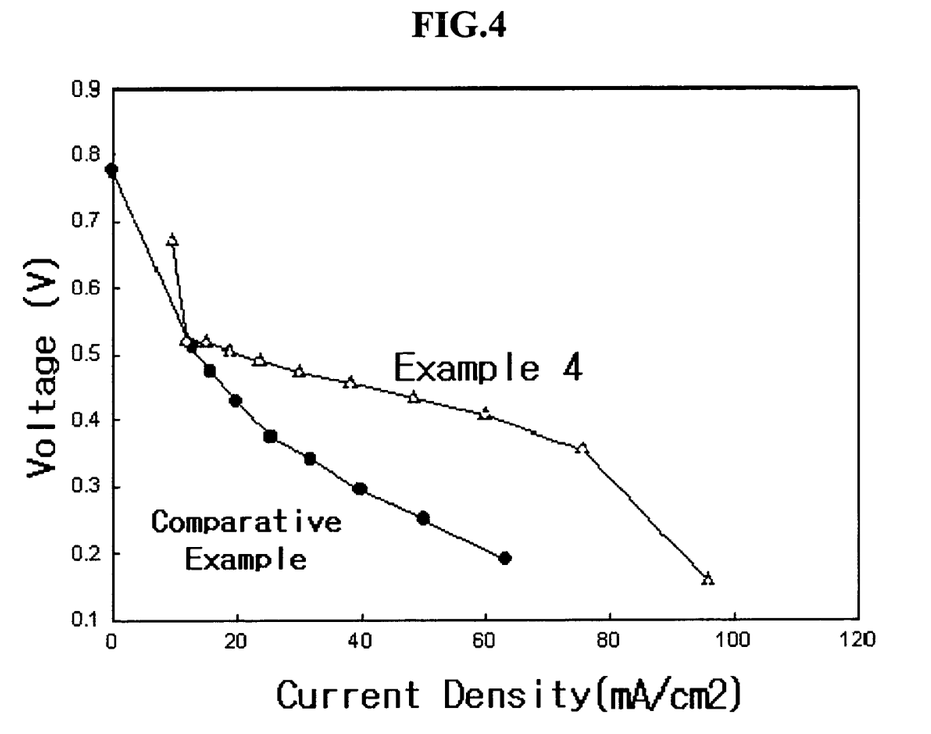
FIG. 4 is a graph that illustrates performance of a fuel cell according to an exemplary embodiment of the present invention.

As is apparent from FIG. 4, at the same current density, the voltage of the fuel cell of Example 4 was significantly higher than that of the fuel cell of the Comparative Example. The improved performance of the fuel cell of Example 4 results from the excellent ionic conductivity and excellent methanol-repelling ability of the composite electrolyte membrane according to the present invention used in Example 4.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A modified inorganic material, comprising:
   an inorganic material; and
   a carboxylic acid-based cation exchanger bonded to the inorganic material,
   wherein the modified inorganic material has an ion exchange capacity of 1 mmol/g to 3 mmol/g, and
   wherein the carboxylic acid-based cation exchanger is an organic material comprising at least a —COOX group, where X is hydrogen or an alkali metal, and has at least a hydrogen bonding site, and
   wherein the modified inorganic material has an average particle size of 20 nm to 200 nm.

2. A method for preparing a modified inorganic material, comprising:
   hydrothermally synthesizing a mixture of a surfactant comprising —SH, an inorganic material precursor, and water to produce a precipitation;
   oxidizing the precipitation using an oxidant; and
   sulfonating the oxidized precipitation.

3. A method for preparing a modified inorganic material, comprising:
   hydrothermally synthesizing a mixture of a surfactant comprising —SH, an inorganic material, and water to form a hydrothermally synthesized inorganic material; and
   sulfonating the hydrothermally synthesized inorganic material.

4. A method for preparing a modified inorganic material, comprising hydrothermally synthesizing a mixture of a surfactant comprising a carboxyl group, an inorganic material, and water,
   wherein the modified inorganic material has an average particle size of 20 nm to 200 nm, and
   wherein the modified inorganic material has an ion exchange capacity of 1 mmol/g to 3 mmol/g.

5. A composite electrolyte membrane, comprising:
   a proton-conducting polymer matrix;
   a modified inorganic material, comprising:
      an inorganic material; and
      a sulfonic acid-based cation exchanger bonded to the inorganic material,
   wherein the modified inorganic material has an ion exchange capacity of 1 mmol/g to 3 mmol/g, and
   wherein the sulfonic acid-based cation exchanger is an organic material comprising at least an —SO$_3$X group, where X is hydrogen or an alkali metal, and has at least a hydrogen bonding site,
   wherein the modified inorganic material has an average particle size of 20 nm to 200 nm, and
   wherein the modified inorganic material is dispersed in the proton-conducting polymer matrix.

6. A fuel cell, comprising:
   a cathode;
   an anode; and
   the composite electrolyte membrane of claim 5.

7. The composite electrolyte membrane of claim 5, wherein a concentration of the modified inorganic material is in the range of 3 wt % to 30 wt %.

* * * * *